United States Statutory Invention Registration [19]

[11] Reg. Number: H934

Ducote [43] Published: Jul. 2, 1991

[54] MALEIC ANHYDRIDE ADJUNCT TO TRIPHENYLBISMUTHINE TO IMPROVE MECHANICAL PROPERTIES OF HYDROXY TERMINATED BINDERS

[75] Inventor: Marjorie E. Ducote, Huntsville, Ala.

[73] Assignee: The United States of America as represented by the Secretary of the Army, Washington, D.C.

[21] Appl. No.: 551,106

[22] Filed: Jul. 9, 1990

[51] Int. Cl.[5] ..... C06B 45/10

[52] U.S. Cl. ..... 149/19.4; 149/19.2

[56] References Cited

U.S. PATENT DOCUMENTS 4,090,893 5/1978 Cucksee et al. ..... 149/19.9

4,913,753 4/1990 Ducote ..... 149/19.9

*Primary Examiner*—Edward A. Miller

*Attorney, Agent, or Firm*—James T. Deaton; Freddie M. Bush

[57] ABSTRACT

Maleic anhydride, MAN, as an adjunct to triphenylbismuthine (TPB) yields improved benefits to the mechanical properties of isophorone diisocyanate cured hydroxy terminated polymer binders. Results from several propellant mixes indicate that both pot life and mechanical properties are affected not only by the concentration of TPB catalyst used, but also by the ratio of TPB to MAN. The ratio of TPB to MAN from about 1 to 0.5 to about 1 to 1.5 produces interesting results in the values of stress, strain, and modulus as shown in the data set forth in the specification and as graphically depicted in the drawing. The weight percent of MAN ranges from about 0.0125 percent to about 0.0375 percent, and the weight percent of TPB ranges from about 0.015 percent to about 0.035 percent.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MALEIC ANHYDRIDE ADJUNCT TO TRIPHENYLBISMUTHINE TO IMPROVE MECHANICAL PROPERTIES OF HYDROXY TERMINATED BINDERS

DEDICATORY CLAUSE

The invention described herein may be manufactured, used, and licensed by or for the Government for governmental purposes without the payment to me of any royalties thereon.

BACKGROUND OF THE INVENTION

Earlier aging studies for hydroxy terminated polybutadiene propellants indicated mild to severe hardening or softening during high temperature aging. Further studies indicated that the changes during high temperature aging was attributed to reaction results of the bonding agents.

Prior art bonding agents including MT4 reaction product of 2.0 moles of tris 1(2 methylaziridinyl)phosphine oxide, 0.7 mole adipic acid, and 0.3 mole tartaric acid), HX752 (bis isophthaloyl 1(2 methyl) aziridine), and other type bonding agents have been employed individually in aging studies to determine effects on propellant physical properties. A hydroxy terminated propellant composition cured with a diisocyanate curing agent and containing MT4 as the bonding agent showed significant softening at high temperature (52° F. and 70° C.) aging. A propellant containing HX752 and cured with isophorone diisocyanate hardened severely under the same conditions.

Applicant's coinvention with Henry C. Allen filed as Ser. No. 840,927 on Oct. 11, 1977, issued as U.S. Pat. No. 4,090,893, and assigned to The United States of America as represented by the Secretary of the Army, Washington, D.C., teaches and claims a bonding agent system for use in a hydroxy terminate polybutadiene propellant composition that is curable with a diisocyanate curing agent. This propellant contains a high solids loading of aluminum metal fuel and ammonium perchlorate oxidizer, and it employs a bonding agent system consisting of MT4, the reaction product of 2.0 moles of tris 1 (2 methyl aziridinyl) phosphine oxide, 0.7 mole adipic acid, and 0.3 mole tartaric acid in an amount from about 0.10 to about 0.20 weight percent of the propellant composition; HX752, bis isophthaloyl 1(2 methyl) aziridine in an amount from about 0.10 to about 0.20 weight percent of the propellant composition; and BIDE, butyliminodiethanol in an amount from about 0.02 to about 0.05 weight percent of the propellant composition.

The above hydroxy-terminated polybutadiene propellant composition employed an optional delay quick cure catalyst system (of each parts) of triphenylbismuthine, magnesium oxide Mg0 and maleic anhydride (MAN)(0–0.05% each). The delayed quick cured system with isophorone diisocyanate (IPDI) makes possible a longer pot like but a shorter cure time of only 2 days as compared to more than 5 days for propellants cured with dimeryl diisocyanate (DDI) and 14 days for propellants cured with IPDI without using a catalyzed cure.

Applicant's U.S. Pat. No. 4,913,753 teaches that an amount from about 0.5% to about 2.0% weight percent of meta-tetramethylxylene diisocyanate (m-TMXDI) is effective in extending propellant pot life and yielding a propellant composition which is less sensitive to temperature change as compared with an isophorone dissocyanate (IPDI) cured composite rocket propellant composition. The domestically produced m-TMXDI is made by a non-phosgenation process developed by American Cyanamid Company's research laboratories. The original proposed application, prior to applicant's patent, for m-TMXDI and p-TMXDI was in reaction injection molding (RIM) which permits the manufacture of urethane parts which require no post-painting. The isomers of either TMXDI which are naturally white (or can be pigmented any desired color) are light stable; and if scratched or damaged in use, they retain their integral color. Triphenylbismuthine (TPB) has been used singly in propellants to obtain higher modulus and/or stress values in composite propellants with isocyanate cured hydroxy terminated polymer binders. TPB has been widely accepted for the designated benefits it provide; however, since the cost of TPB is in the range of $1.08 per gram, an adjunct to TPB having only a fractional part of the cost of TPB and which imparts equal or improved benefits to the mechanical properties in hydroxyterminated binders would be attractive in view of present budget restraints to reduce cost.

SUMMARY OF THE INVENTION

Maleic anhydride, MAN, as an adjunct to triphenylbismuthine (TPB) yields improved benefits to the mechanical properties of isophorone diisocyanate cured hydroxy terminated polymer binders. Results from several propellant mixes indicate that both pot life and mechanical properties are affected not only by the concentration of TPB catalyst used, but also by the ratio of TPB to MAN. The ratio of TPB to MAN from about 1 to 0.5 to about 1 to 1.5 produces interesting results in the values of stress, strain, and modulus as shown in the data set forth hereinbelow and as graphically depicted in the drawing.

Higher modulus and stress values are obtained by using MAN as an adjunct to TPB in a cure catalyst system for hydroxyterminated polymers cured with isocyanate curatives. Equivalent mechanical properties of propellants containing a reduced amount of TPB when supplemented with MAN, as compared to those propellants containing TPB without MAN, are obtained.

The composite rocket propellants containing hydroxyterminated polymers cured with m-tetramethylxylenediisocyanate (m-TMXDI) as disclosed and claimed in applicant's U.S. Pat. No. 4,913,753, issued Apr. 3, 1990 and assigned to United States of America as represented by the Secretary of the Army, Washington, D.C., was further tested with TPB: Man in ratios from 1:1 to 1:1.5 to show the improvements to modulus and stress values which is achieved when this domestically produced and recently qualified isocyanate curative for propellant is used as specified.

DESCRIPTION OF THE PREFERRED EMBODIMENT(S)

Higher modulus and/or stress values are obtained for composite propellants with isocyanate cured hydroxy terminated polymer binders when triphenylbismuthine and maleic anhydride (MAN) are used in ratios from 1:1 TPB:MAN to 1:1.5 TPB:MAN in predetermined amounts each. MAN permits a reduction in the amount of TPB. The cost comparison of $1.08 per gram for TPB compared to a cost of $0.005 per gram of MAN translates to a savings from 46% to 64% for the specified ratio of TPB:MAN used.

Table I depicts physical property data of IPDI cured propellants with TPB and MAN in amounts from 0.02 TPB to 0.025% and 0% MAN to 0.03% wherein the ratio of TPB:MAN varies from 1:0, 1:1 and 1: 1.5.

Table II depicts the effect on mechanical properties of various concentration in percent TPB used in m-TMXDI cured propellants.

Figure 1:
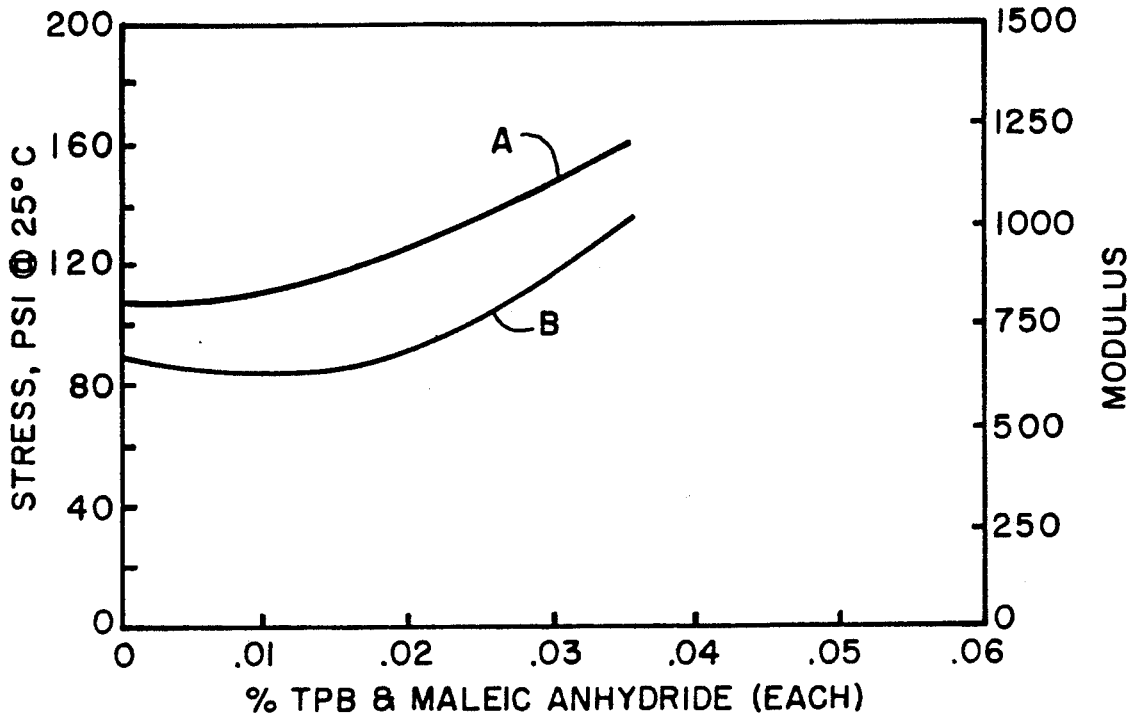
FIG. 1 depicts the increase in stress and modulus values achieved from use of 1:1 TPB:MAN in m-TMXDI cured propellant compositions.
Figure 2:
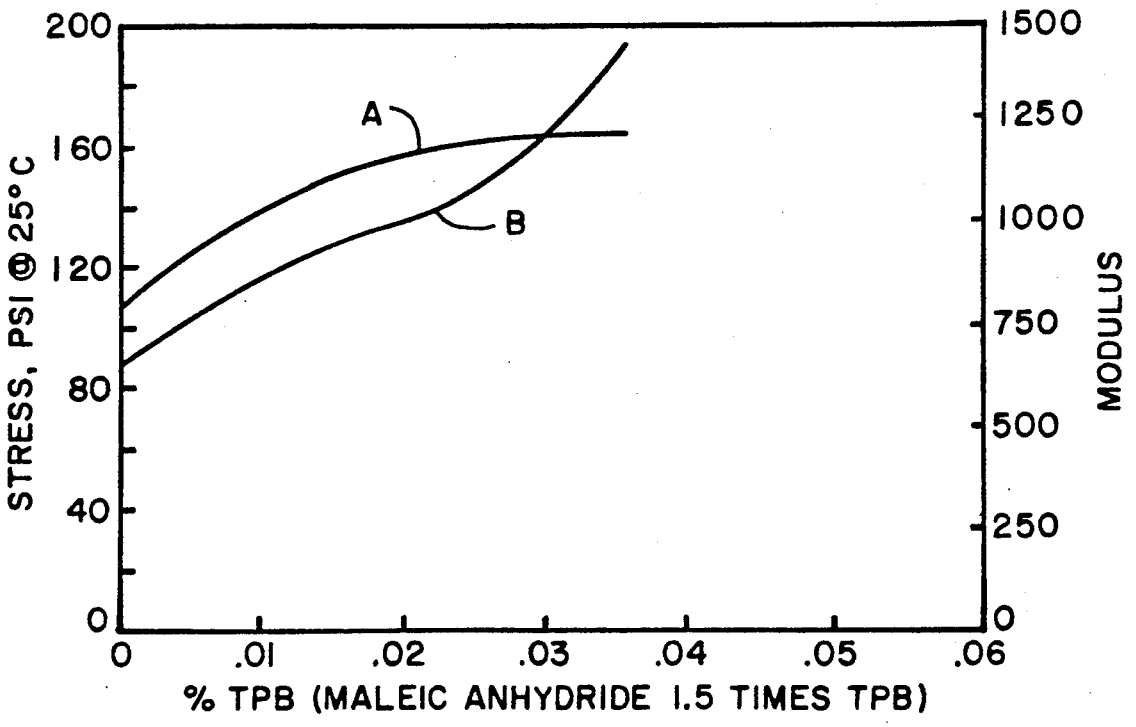
FIG. 2 depicts the increase in stress and modules values achieved from use of 1:1.5 TPB:MAN in m-TMXDI cured propellants.

Table III depicts the effect of TPB concentrations and MAN concentrations and the TPB:MAN ratios on mechanical properties of m-TMXDI cured propellants.

depicted graphically in FIGS. 1 and 2. Curves A and B of FIGS. 1 and 2 depict stress and modulus respectively.

TABLE I, Physical Property Data of IPDI Cured Propellants shows the effect on mechanical properties of isophorone dissocyanate (IPDI) cured propellants with the addition of 0.02 and 0.03% MAN with 0.02% TPB. Modulus at 25° C. increased 12% with 0.02% MAN. With 0.03% MAN modulus increased 49% and stress increased 18% over that of the baseline formulation which contained no MAN. At 25° C., the composition containing 0.02% TPB and 0.03% MAN had 21% greater modulus and 9% greater stress than the composition containing 0.025% each of the TPB and MAN. At 60° C., modulus increased 47% with the addition of 0.03% MAN; WITH 0.025% EACH TPB and MAN, the modulus increased by 13%. Higher modulus at elevated environmental temperatures can be important in preventing propellant grain slump and deformation. The addition of MAN to the propellant formulations caused no significant change in stress at −40° C. This is important because low stress capability at low temperatures can result in grain fracture during storage or ignition in a cold environment.

A series of mixes with tetramethylxylenediisocyanate

TABLE I

PHYSICAL PROPERTY DATA OF IPDI CURED PROPELLANTS

| PROPELLANT ID: | | TPB 0.02 MAN 0.00 | TPB 0.02 0.02 | TPB 0.02 0.03 | 0.025 0.025 |
|---|---|---|---|---|---|
| | IPDI | | | | |
| +60° C. | STRESS, psi | 76 | | 93 | 82 |
| | STRAIN, max/brk | 37.5 38.6 | | 28.3 30.7 | 37.5 39.0 |
| | MODULUS | 412 | | 607 | 466 |
| +25° C. | STRESS, psi | 113 | 111 | 133 | 120 |
| | STRAIN, max/brk | 38.9 40.6 | 40.6 42.3 | 32.0 34.4 | 36.0 40.9 |
| | MODULUS | 542 | 608 | 808 | 670 |
| −40° C. | STRESS, psi | 307 | 320 | 323 | 300 |
| | STRAIN, max/brk | 41.1 47.7 | 40.6 48.6 | 37.3 50.3 | 44.7 52.0 |
| | MODULUS | 5407 | 5630 | 6206 | 6206 |

TABLE II

EFFECT OF TPB CONCENTRATION ON MECHANICAL PROPERTIES

| | % TPB | None | 0.015 | 0.025 | 0.035 | 0.045 |
|---|---|---|---|---|---|---|
| +25° C. | STRESS, psi | 107 | 107 | 115 | 122 | 123 |
| | STRAIN, max/brk | 32.6/37.6 | 41.9/46.5 | 40.0/42.9 | 40.2/42.0 | 34.7/35.3 |
| | MODULUS | 664 | 542 | 652 | 680 | 762 |

TABLE III

EFFECT OF TPB CONCENTRATION AND TPB/MAN RATIO ON MECHANICAL PROPERTIES

| TPB TO MAN RATIO | | 1:0.5 | 1:1 | 1:1.5 |
|---|---|---|---|---|
| | TPB 0.015% | | MAN 0.015% | MAN 0.0225% |
| +25° C. | STRESS, psi | | 118 | 151 |
| | STRAIN, max/brk | | 35.9/38.2 | 35.2/37.8 |
| | MODULUS | | 637 | 956 |
| | TPB 0.025% | MAN 0.0125% | MAN 0.025% | MAN 0.0375% |
| +25° C. | STRESS, psi | 128 | 139 | 162 |
| | STRAIN, max/brk | 33.2/33.8 | 35.4/38.7 | 27.3/27.5 |
| | MODULUS | 724 | 777 | 1092 |
| | TPB 0.035% | | MAN 0.035% | MAN 0.0525% |
| +25° C. | STRESS, psi | | 162 | 164 |
| | STRAIN, max/brk | | 31.8/34.4 | 21.3/23.1 |
| | MODULUS | | 1025 | 1418 |

Further discussions and correlations of the data of Tables I, II, and III are set forth hereinbelow, and the results achieved in improved mechanical properties are (m-TMXDI) as the curing agent showed the effects of varying both the concentration of TPB and MAN and the ratio of TPB to MAN. Table II shows the results of increasing TPB when TPB alone is used. Maximum stress increased with increasing concentration of TPB up to 0.035%. At 0.035% TPB maximum stress valued was 14% above the max stress of the uncatalyzed propellant. No further increases in max stress occurred beyond 0.035% TPB but modulus continued to increase and strain values decreased.

Results from several mixes employing m-TMXDI suggest that both pot life and mechanical properties are affected not only by the concentration of TPB catalyst used, but also by the ratio of TPB to MAN. To quantify this effect, a series of mixes was made in which the concentration of TPB and the TPB to MAN ratio was varied. Results are tabulated in TABLE III, Effect of TPB Concentration and TPB/MAN Ratio on Mechanical Properties.

All values, stress, strain, and modulus of propellant containing 0.015% TPB with 0.0225% MAN (a 1 to 1.5 ratio) were higher than those of the propellant containing 0.025 TPB and 0.0125% MAN (a 1 to 0.5 ratio). Its stress and modulus values were also higher than those of the propellant containing 0.025% each of TPB and MAN, while their strain values were equivalent. Equivalent stress and comparable modulus values were obtained with 0.025% TPB with 1 to 1.5 of TPB to MAN and a 1 to 1 ratio of 0.035% TPB to MAN. Greater increase in stress and modulus was demonstrated by increasing the concentration of MAN with 0.015% TPB. Stress increased 28% and modulus 50% at 25° C. when the ratio of TPB to MAN was changed from 1:1 to 1:1.5 with 0.015% TPB. Strain remained the same. With 0.025% TPB stress and modulus increased 17 and 40%, respectively, with the change from 1:1 to 1:1.5 TPB:MAN, with 0.035%, stress and modulus increased 1 and 38%, respectively, with the same ratio change. In both of these last two cases, strain was significantly reduced.

In further reference to the Figures of the Drawing, FIGS. 1 and 2, (Curves A and B, stress and modulus), respectively show the effect on mechanical properties of increasing concentrations of 1:1 and 1:1.5 TPB to MAN, respectively. It is evident that to obtain maximum stress with the 1:1 ratio, 0.035% TPB is required whereas the same maximum stress is reached with 0.025% TPB with 1:1.5 TPB to MAN.

In conclusion, higher modulus and stress values are obtained by using MAN as an adjunct to TPB in a cure catalyst system for hydroxyterminated polymers cured with isocyanate curatives. By the use of MAN with TPB the concentration of TPB can be reduced yet equivalent mechanical properties of propellants containing TPB without MAN can be attained. The resulting cost savings is readily recognized since the cost comparison of TPB:MAN is $1.080/gram:$0.005/gram.

I claim:

1. A composite propellant composition comprising oxidizer an isocyanate curing agent selected from isophorone diisocyanate and tetramethylxylenediisocyanate; a hydroxyterminated polymer binder; and triphenylbismuthine in a weight percent range from about 0.015 to about 0.035 having improved, higher modulus and/or stress values which employs in said composite propellant composition a cure catalyst system consisting of maleic anhydride in a weight percent range from about 0.0125 percent to about 0.0375 percent in combination with said triphenylbisumthine, said weight percent ranges of said triphenylbismuthine and said maleic anhydride being selected to provide a ratio of said weight percent ranges of said triphenylbismuthine and said maleic anhydride from about 1 to 0.5 to about 1 to 1.5.

2. The composite propellant composition as defined in claim 1 wherein the ratio of said maleic anhydride to said triphenylbismuthine of said cure catalyst system is from about 1:1 to about 1:1.5 at a weight percent of 0.02 and 0.02 and 0.02 and 0.03 respectively which yields higher modulus and stress values as compared with a composite propellant composition which contains only 0.02 weight percent triphenylbismuthine and as compared with said composite propellant composition which contains 0.2 weight percent each of said triphenylbismuthine and said maleic anhydride.

3. The composite propellant composition and the improvement as defined in claim 1 wherein said ratio of said triphenylbismuthine to said maleic anhydride is 1:1 and said weight percent of said triphenylbismuthine and said maleic anhydride is 0.035% of each which yields higher modulus and higher stress values as compared with said composite propellant composition containing said 1:1 ratio at weight percents of 0.015 and 0.025 respectively of said triphenylbismuthine and maleic anhydride.

4. The composition propellant composition as defined in claim 1 wherein said ratio of said triphenylbismuthine to said maleic anhydride is 1:1.5 and said weight percent of said triphenylbismuthine and said maleic anhydride is 0.025 and 0.0375% respectively which yields higher modulus and higher stress values as compared with said composite propellant composition containing said 1:1.5 ratio at weight percents of 0.015 and 0.0225 respectively of said triphenylbismuthine and maleic anhydride.

* * * * *